US006545660B1

(12) United States Patent
Shen et al.

(10) Patent No.: US 6,545,660 B1
(45) Date of Patent: Apr. 8, 2003

(54) MULTI-USER INTERACTIVE PICTURE PRESENTATION SYSTEM AND METHOD

(75) Inventors: Chia Shen, Arlington, MA (US); Neal B. Lesh, Cambridge, MA (US); Ryan S. Bardsley, Boston, MA (US); Paul A. Beardsley, Boston, MA (US); Baback Moghaddam, Cambridge, MA (US)

(73) Assignee: Mitsubishi Electric Research Laboratory, Inc., Cambridge, MA (US)

( * ) Notice: Subject to any disclaimer, the term of this patent is extended or adjusted under 35 U.S.C. 154(b) by 314 days.

(21) Appl. No.: 09/651,002

(22) Filed: Aug. 29, 2000

(51) Int. Cl.$^7$ ................................................ G09G 5/00
(52) U.S. Cl. ...................... 345/156; 345/173
(58) Field of Search .......................... 345/173, 174, 345/175, 176, 177, 178, 7, 8, 9, 211, 212, 213, 156, 168; 348/740, 744, 751, 743

(56) References Cited

U.S. PATENT DOCUMENTS

| | | | | |
|---|---|---|---|---|
| 4,763,356 A | * | 8/1988 | Day, Jr. et al. | 345/173 |
| 5,523,802 A | * | 6/1996 | Sugihara et al. | 348/743 |
| 5,859,623 A | | 1/1999 | Meyn et al. | 345/1 |
| 5,917,480 A | | 6/1999 | Tafoya et al. | 345/302 |
| 6,037,943 A | | 3/2000 | Crone et al. | 345/357 |
| 6,075,502 A | * | 6/2000 | McDowa et al. | 345/7 |

OTHER PUBLICATIONS

Balabanovic et al., "Storytelling with Digital Photographs"; CHI 2000, Apr., 2000; pp. 564–571.
Elliott et al., "How Large Should a Digital Desk Be? Qualitative Results of a Comparative Study".
Kang et al., "PhotoFinder: Browsing and Searching for Personal Photos within a Collection".
North et al., "Snap–Together Visualization: A User Interface for Coordinating Visualizations via Relational Schemata".
Robertson et al.; "Data Mountain: Using Spatial Memory for Document Management".
Streitz et al.; "i–Land: An Interactive Landscape for Creativity and Innovation"; Proceedings of the ACM Conference on Human Factors in Computing Systems (CHI 1999), pp. 120–127.
"Picture It 2000". Microsoft.
"Shoebox Image Browsing"; AT&T Laboratories Cambridge. 1999. www.damstadt.gmd.de/ambiente/activities/interactable.html.
"Build–It" Pre–CAD planning tool. TellWare GmbH.

* cited by examiner

*Primary Examiner*—Xiao Wu
(74) *Attorney, Agent, or Firm*—Dirk Brinkman

(57) ABSTRACT

A system enables multiple users to interact with a picture presentation. The system includes a display surface having a horizontal orientation, preferably circular. A processor is configured to composite an image. The composite image includes a picture display area, an orientation area, and a plurality of control panels. There is one control panel for each of the users. A database, coupled to the processor, stores annotated pictures. Selected annotated pictures are to be composited into the picture display area of the displayed image. The pictures are selected using the control panel. A display device, coupled to the processor, displays the composite image on the display surface, and an input device is used to interact with the control panels, the orientation area, and the annotated pictures to enable the users to concurrently control the compositing of the sequence of images.

17 Claims, 21 Drawing Sheets

MULTI-USER INTERACTIVE PICTURE PRESENTATION SYSTEM AND METHOD

FIELD OF THE INVENTION

The present invention relates generally to computer-implemented presentations systems, and more specifically, the present invention relates to an improved method and system to enable multiple users to interact with content of a picture presentation during the course of the presentation.

BACKGROUND OF THE INVENTION

Picture presentations are an important aspects of many professional and social setting. Executives make presentations to directors, managers conduct meetings with staff, salespersons make presentations to potential customers, doctors conduct meetings with nurses, lawyers make presentations to juries, and families and friends present and share pictures of important occasions in their lives.

Frequently, much effort goes into generating and delivering effective picture presentations. With specialized software, conventional personal computer systems can provide effective platforms for generating and conducting presentations. Currently available presentation program modules can turn a personal computer into a customized presentation system for generating and delivering picture presentations.

Generally described, these prior art presentation systems provide a specially designed, user-friendly, pallet of tools to assist in the generation of a presentation to be subsequently displayed to an audience. These presentation systems also allow the pictures to be sequentially presented to an audience, picture-by-picture, with color, animation, audio, and transition effects that enrich and enliven the presentation.

Conventional presentation systems do not provide an effective means for interacting with the content of the presentation during the course of the presentation. This drawback arises because these conventional presentation systems have only two modes of operation, an edit mode and a show mode. A single user often generates the presentation, and then subsequently delivers the same presentation to an audience. During the course of the presentation, the single user can interact with the content of the presentation only by invoking the edit mode which primarily allows the user to rearrange the order in which the presentation is arranged.

A significant drawback arises when using these conventional presentation systems because all participants of the presentation cannot concurrently interact with the content of the presentation. Conventional systems are designed for use by a single presenter to a passive audience, and not for a setting where all participants of the presentation interact with the presentation on an equal footing. The presentation is typically conducted in a linear setting. The presenter faces the audience, and the audience views the presentation behind the presenter. The presenter can either look at the audience or the presentation, but not at both at the same time.

Furthermore, a conventional presentation system only has a single set of controls. To allow any one other than the presenter to control the presentation can be quite disruptive and cumbersome. Also, most computer implemented presentation systems that display multiple pictures at once use the same rectangular format as used by mechanical slide-sorter. These require that the typical single user has a specific orientation to the displayed presentation. These type of systems are not amendable to situations where multiple participants are facing each other, and the displayed presentation, in a highly interactive and multi-dimensional manner.

In view of these drawbacks associated with conventional presentation systems, there is a need for an improved method and system that allows multiple users to interact with the content of a presentation during the course of the presentation.

SUMMARY OF THE INVENTION

The invention provides a system that enables multiple users to interact with a picture presentation. The system includes a display surface having a horizontal orientation, preferably circular. The display surface can be touch sensitive. A processor is configured to composite an image. The composite image includes a picture display area, an orientation area, and a plurality of control panels. There is one control panel for each of the users.

A database, coupled to the processor, stores annotated pictures. The annotated pictures are to be composited into the picture display area of the displayed image. A display device, coupled to the processor, displays the composite image on the display surface, and an input device is used to interact with the control panels, the orientation area, and the annotated pictures to enable the users to concurrently control the compositing of the sequence of images.

Each control panel includes people, calendar, location, an events icons for selecting the pictures to be composited. The control panel also includes inkpad, keyboard, work space, new, show, and a summary icons. These are displayed in black on a white background when inactive, and in full color when activated. Composited pictures in the image are first shown in gray scale, and selected pictures are shown in full color. The pictures are composited with an orientation toward a particular control panel and user that selected the pictures.

DETAILED DESCRIPTION OF THE PREFERRED EMBODIMENT

Figure 1:
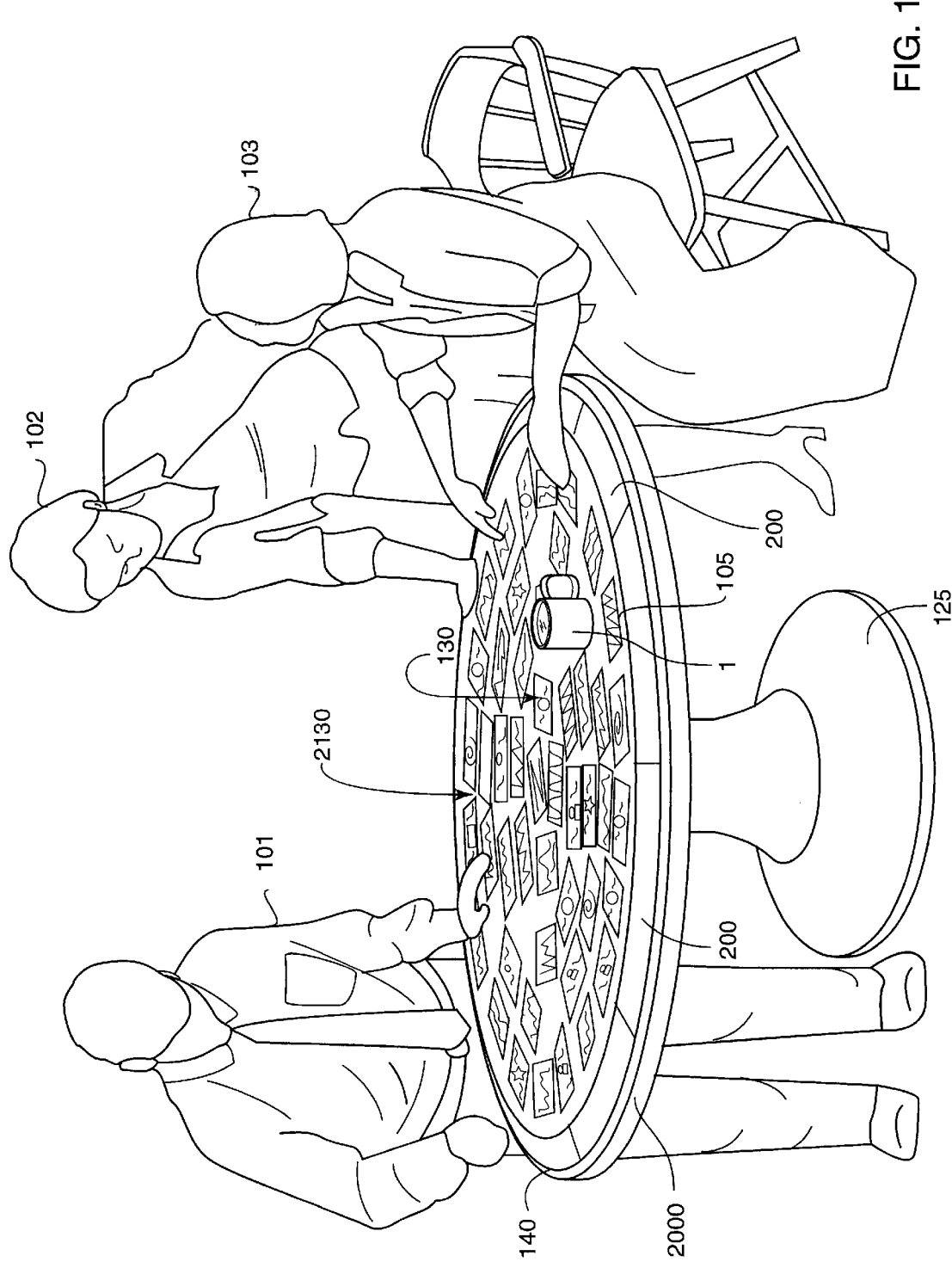
FIG. 1 is a diagram of an multi-user interactive presentation system according to the invention.

FIG. 1 shows multiple users 101–103 in the vicinity of a presentation system 2000 according to the invention. The users are sharing and interacting with a picture presentation in a dynamic manner. The method according to the invention displays a sequence of images 2130 on a display surface, i.e., the horizontal top 130 of a circular table 125. In the preferred embodiment the display surface is touch sensitive.

Figure 20:
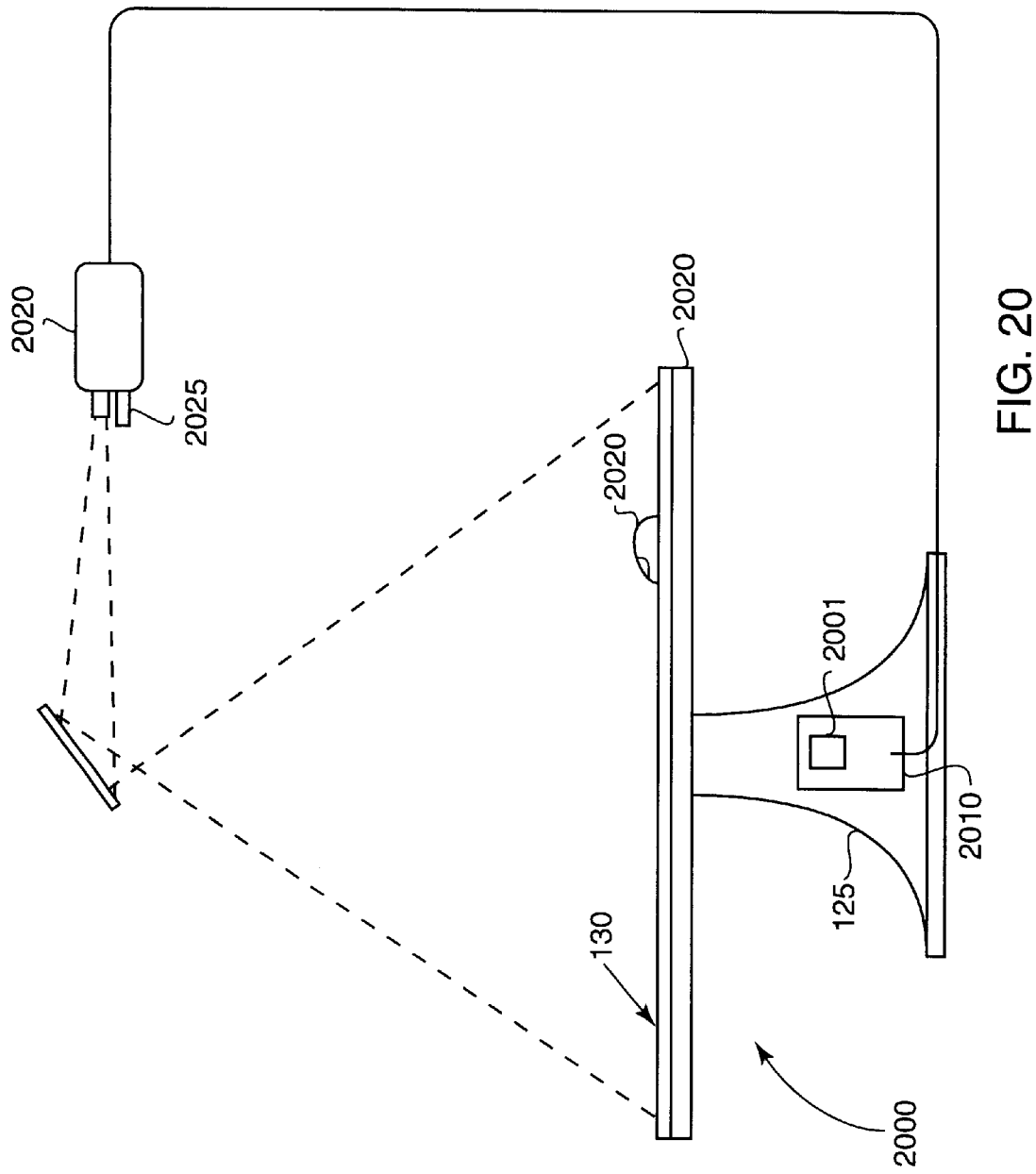
FIG. 20 is a block diagram of a presentation system according to the invention.
Figure 21:
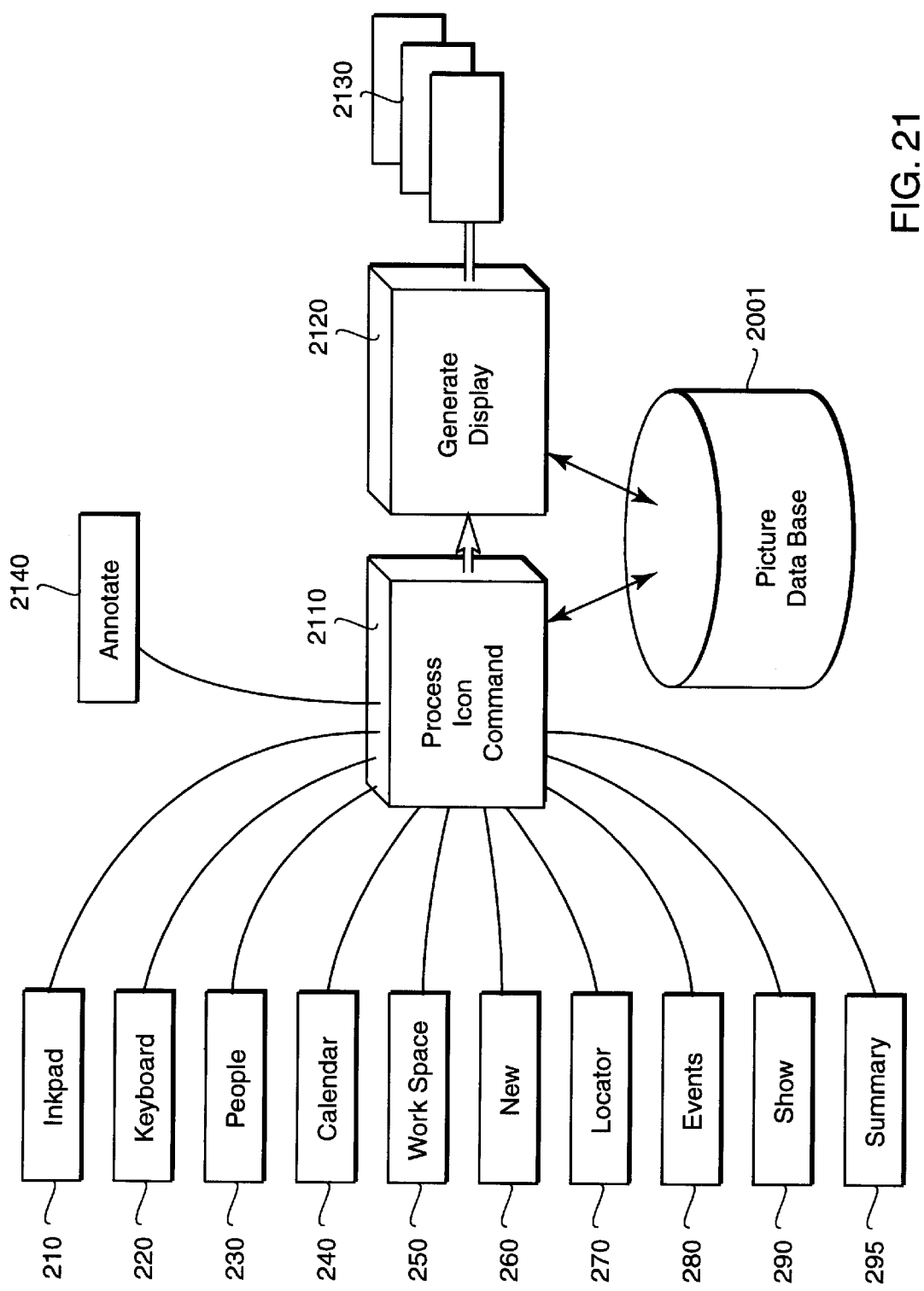
FIG. 21 is a block diagram of a process used by the presentation system according to the invention.

The images are composited by a processor 2001 executing a method 2100 according to the invention, see FIGS. 20–21. The composited images are displayed onto the display surface by the process 2100. The displayed images are composited in response to user commands. As an advantage, the present system can be operated concurrently by multiple users. In the preferred embodiment, the display surface and the images are circular.

Some of the Figures also show a coffee mug 1 on the top of the table. The coffee mug is not part of the invention, but often coffee mugs are key items present during presentation, professional or social. As an advantage, the present invention gracefully admits integration of coffee mugs or other discussion items with the presentation. In fact, using a camera 2025 coupled to a vision system of the processor 2001, the displayed images can be composited in such a way that items that are not part of the display surface do not obscure significant portions of the images.

Each image 2130 in the sequence includes a picture display area 135, an orientation area 140, and a plurality of control panels 200. In the preferred embodiment, the orientation area 140 is an annular ring at the periphery of the images that defines the internal picture display area 135, and the control panels are composited within the annular ring. There is one control panel for each user.

The control panels 200 are displayed in a region of the display surface 130 in front of the user. The camera 2025 can be used to track the users 101–103 so that as the users move around the display table, their respective control panels follow. Alternatively, the users can employ an input pointing device to indicate where their respective control panels should appear on the table top.

The main purpose of the system 2000 is to manipulate and present photographs, slides, text, videos, hereinafter "pictures" 105. The pictures are manipulated by the users using the control panels. The pictures can be associated with sound-tracks so that when pictures are selected, the sound-track can also be played. The pictures can also be annotated with text.

The "pictures" 105 are organized in a relational database 2001, described in further detail below, see FIG. 21. The pictures can be in the form of digital images, e.g., files with bmp, .jpg, mpg, .gif, .pdf, or .eps extensions, to name but a few. Pictures can have associated audio files in .wav files, for example. As described below, each picture is annotated according to names or "people," date or "calendar," location, and events.

Pictures 105 are selected from the database with the control panels 200 and the selected pictures are composited into the displayed images 2130.

Multiple users can interact with compositing process in a concurrent and interactive manner.

The orientation area 140 is used to orient the "content" of the presentation image 2130. If the orientation area is circular, then the displayed image can be rotated like a lazy Susan. The rotation is achieved by the process 2100 that composites the image with a selected orientation. The ring can be projected onto the touch sensitive surface of the table top.

Figure 2:
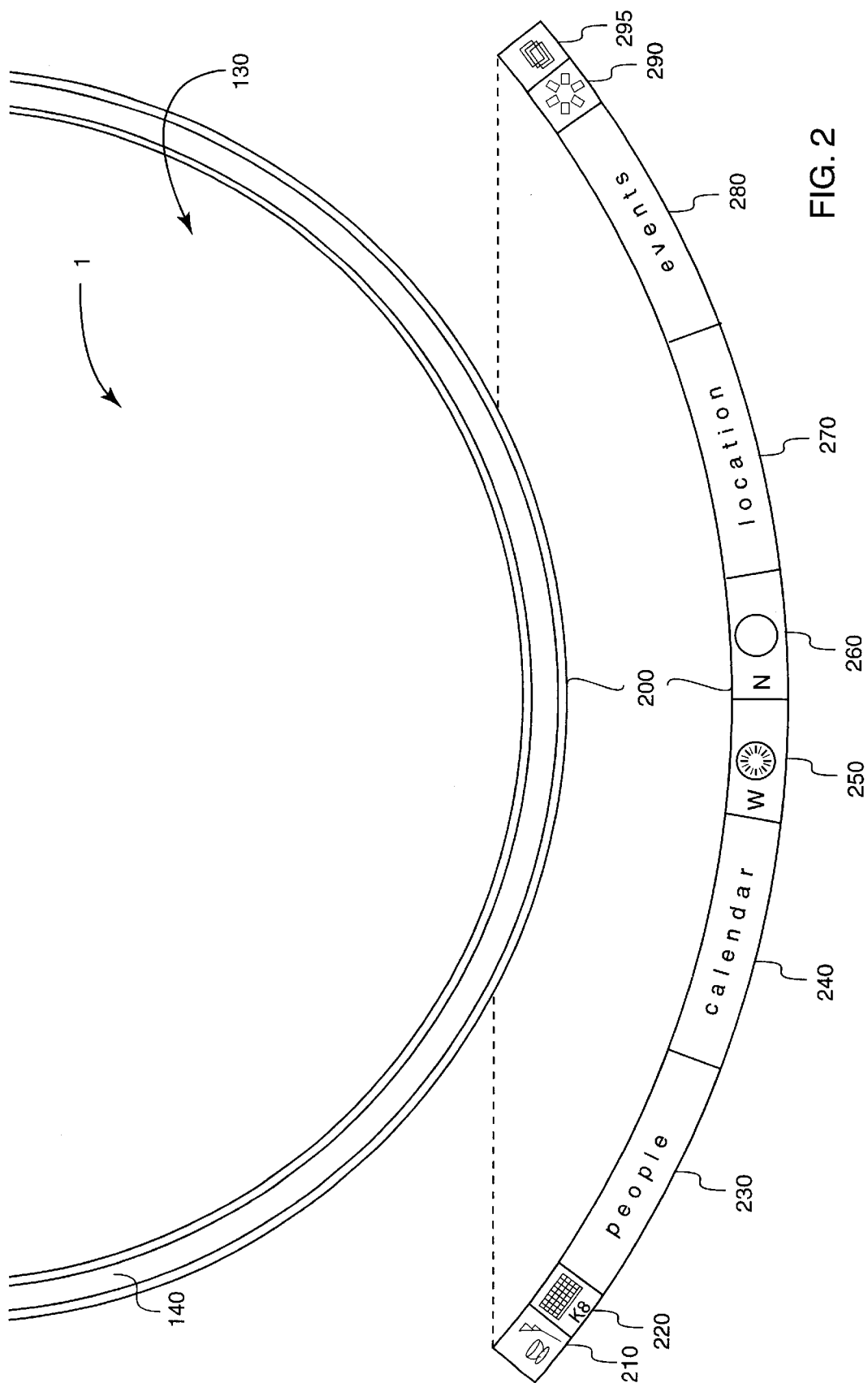
FIG. 2 is a diagram of a display area and a user control panel.

FIG. 2 shows icons of the place mat or control panel 200 in greater detail. Each user control panel includes the following icons: an inkpad 210, a keyboard 220, a people 230, a calendar 240, a work space 250, a new 260, a location 270, an events 280, a show 290, and a summary 295. A mouse or a touch sensitive technique can be used to activate the icons of the control panels 200. Initially, the icons are displayed as black on a white background, but when an icon is activated or selected, the icon is displayed in full color.

Figure 5:
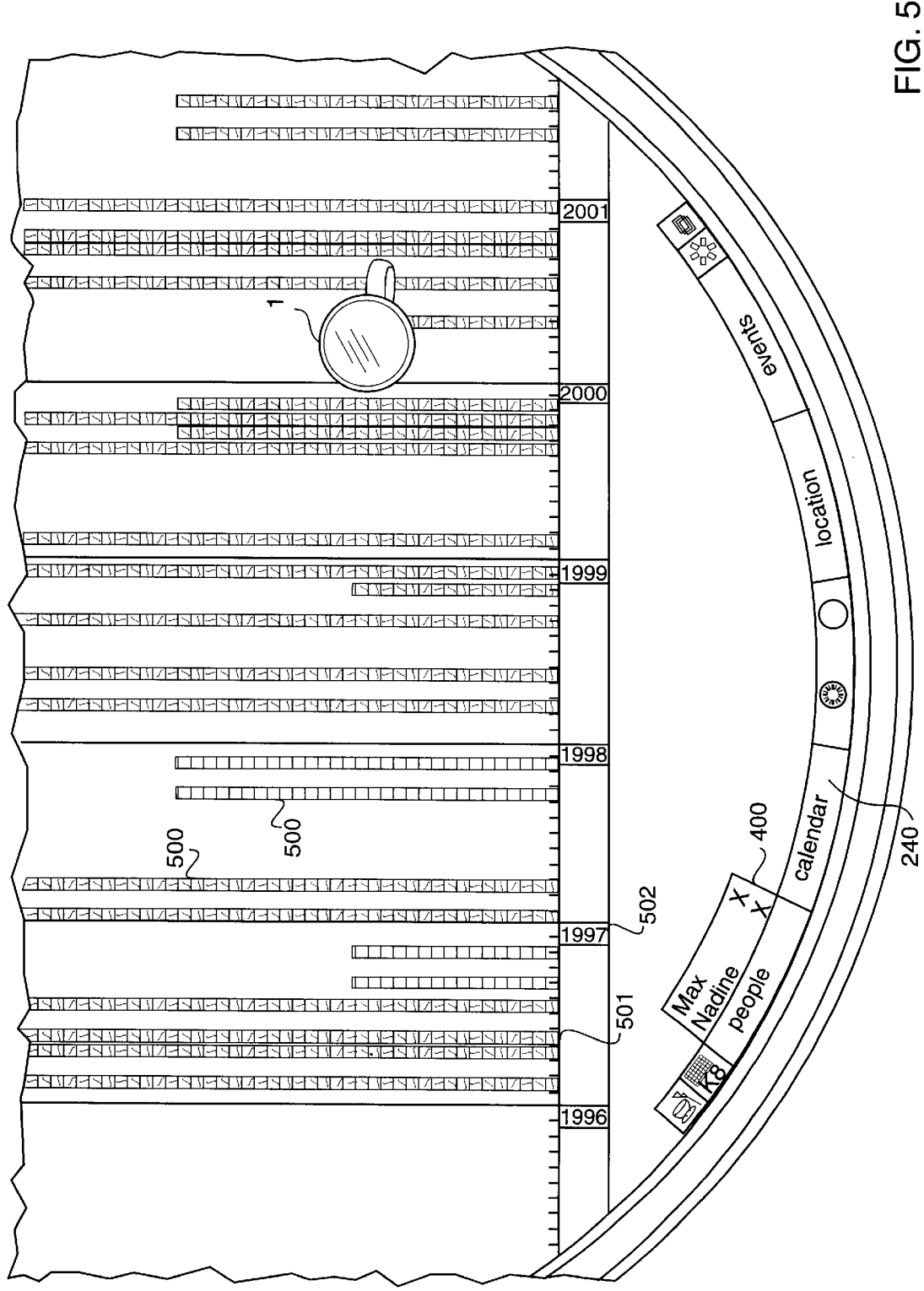
FIG. 5 is a diagram of pictures organized according to calendar year.
Figure 6:
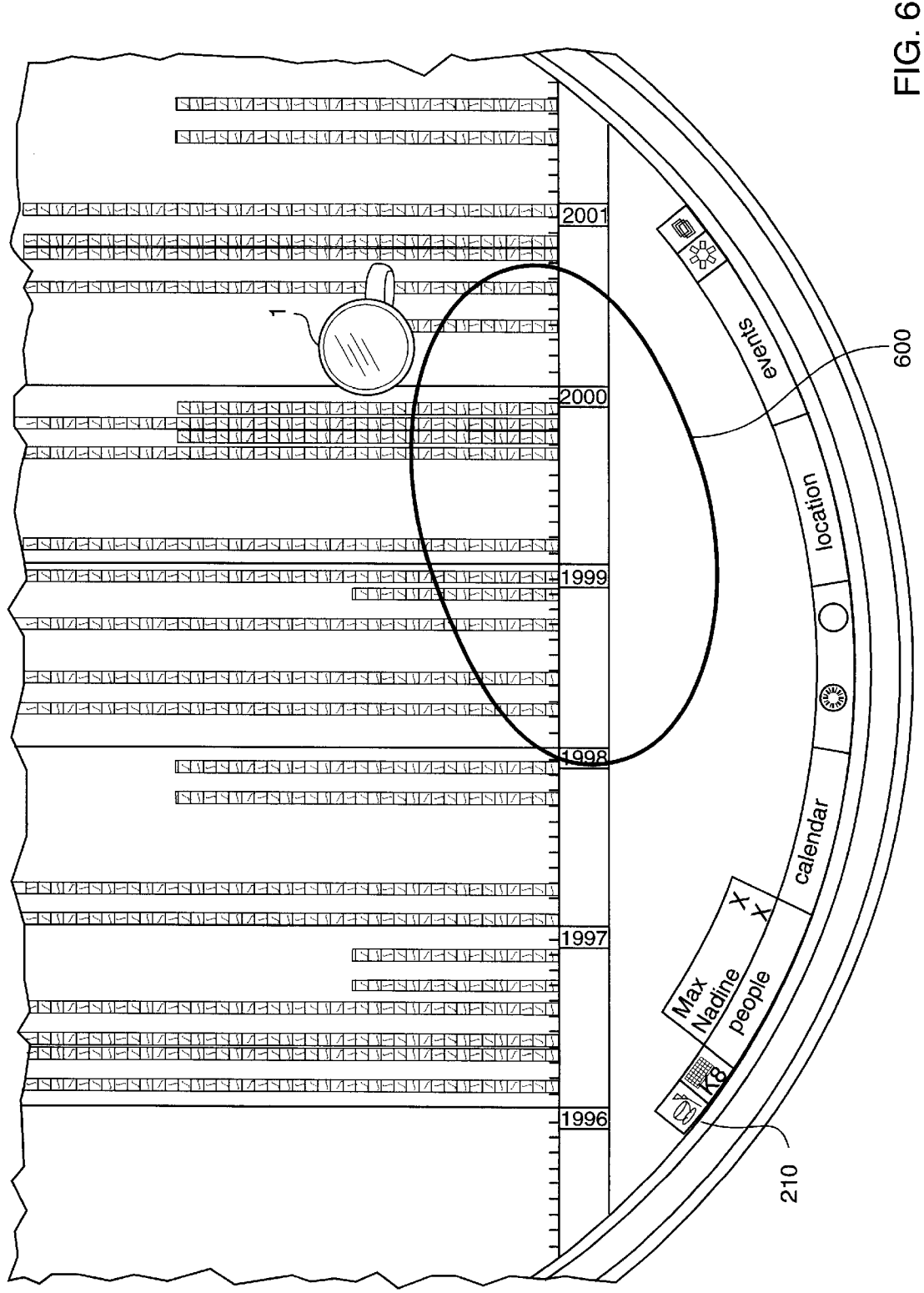
FIG. 6 is a diagram of selecting specific years.

The inkpad icon 210 switches operation to a mode where a pointing device, e.g., a mouse or a finger, can be used to select an area of the displayed image, see FIG. 6. The keyboard icon, when activated, displays a touch sensitive keyboard, see FIG. 19. The people icon 230 displays a people panel, see FIGS. 3–4. The calendar icon 240 displays images in a calendar view, see FIG. 5. The workspace icon 250 displays a workspace and any images that last were part of the work space. The work space behaves as a scratch or copy buffer. Pictures saved in the workspace can be later recovered.

Figure 17:
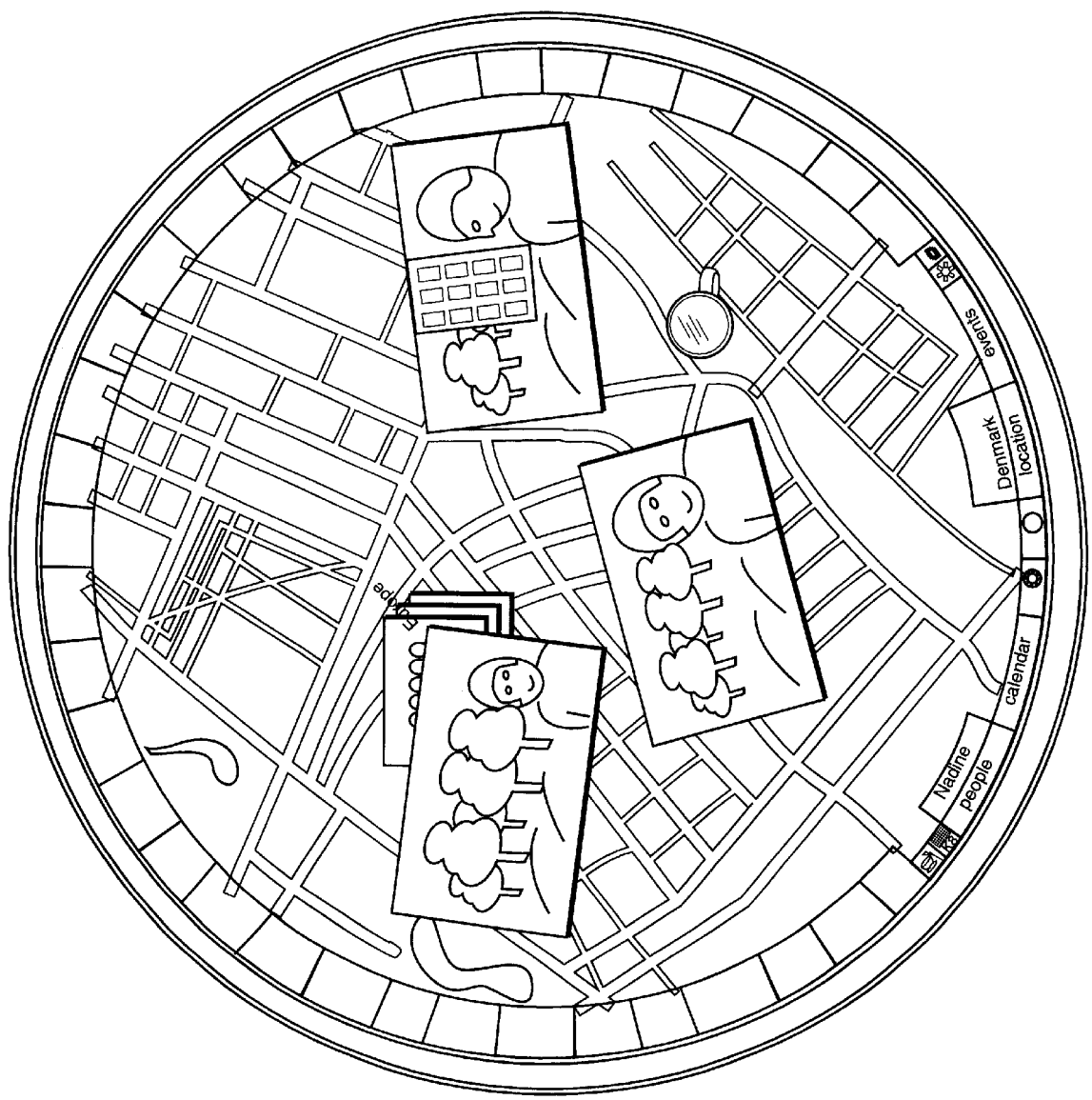
Figure 18:
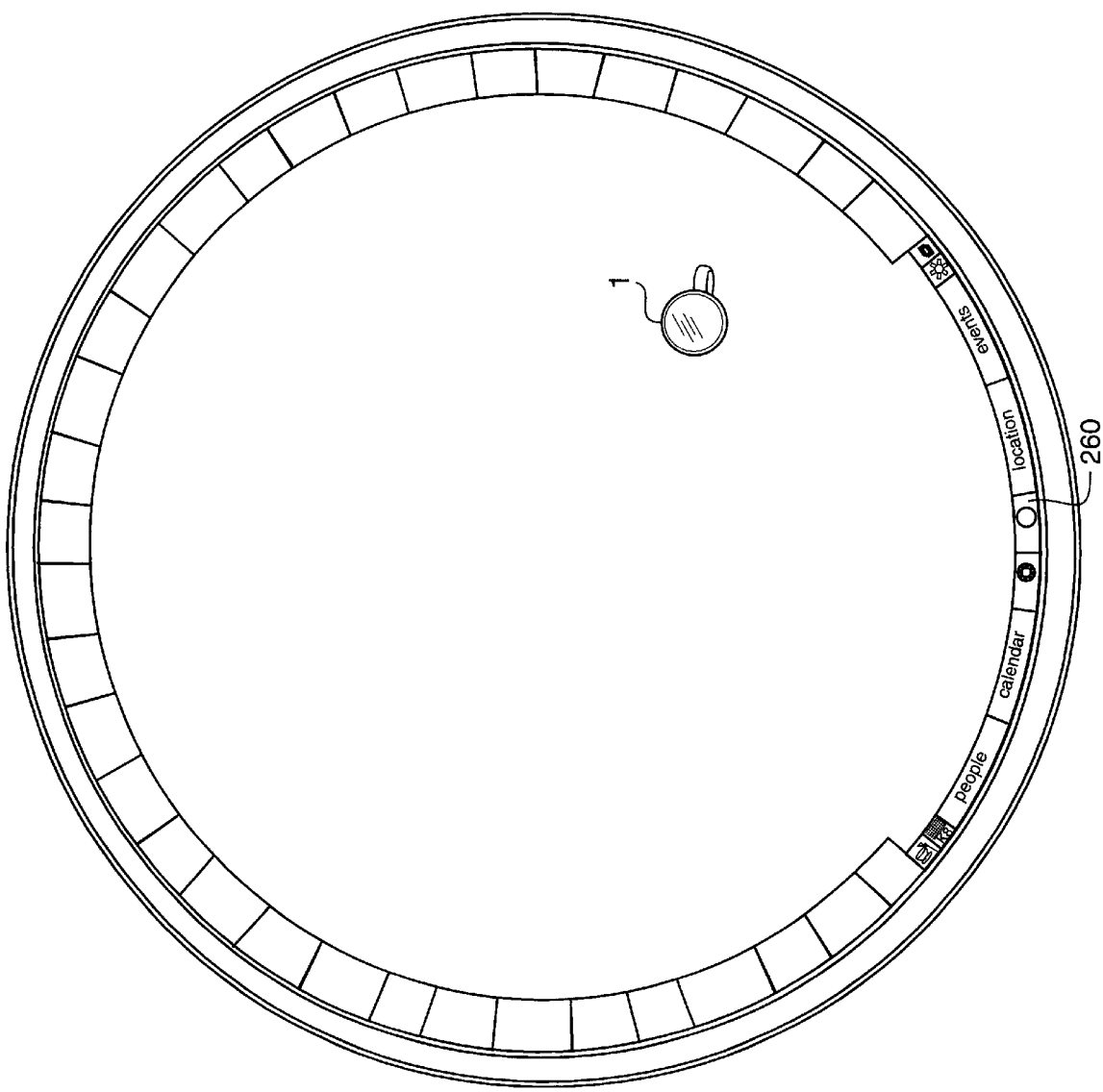
FIG. 18 are a view of an initial display image of a presentation.

The new icon 260 resets the table top display to an initial condition, see FIG. 18. The location icon 250 displays a map, see FIG. 17. The events icon 260 arranges the display in an events oriented mode, see FIG. 11. The show icon 270 displays all selected pictures, see FIG. 9. The summary icon 290 display a subset of currently selected pictures as shown in FIG. 10.

Figure 3:
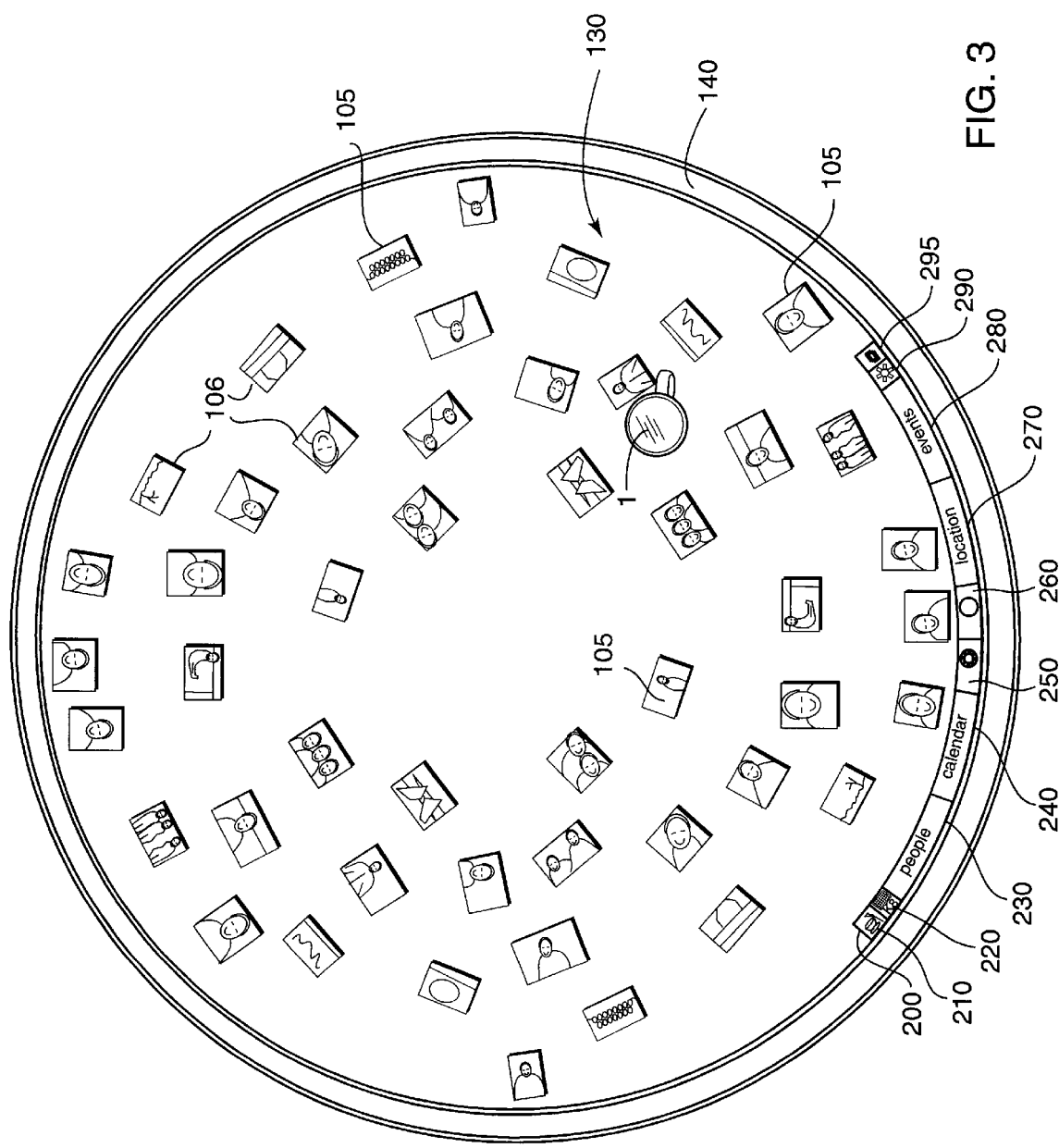
FIG. 3 is a diagram of a multiple picture presentation.

As shown in FIG. 3, the content of the displayed image 120, i.e., the pictures 105 are manipulated by the people, calendar, location, and events icons. The processor, described below integrates, all separate digital files of pictures into a single image for display purpose, thus individual pictures or the entire image as a whole can readily be manipulated.

FIG. 3 shows the arrangement of the pictures when the people icon 230 is activated or selected. In this case, each picture 105 includes a picture of one or persons, and annotation text identifying the people in the pictures. Initially, the pictures are shown using a gray scale. If a specific picture 105 is specifically selected, then that picture is shown in full color.

Figure 4:
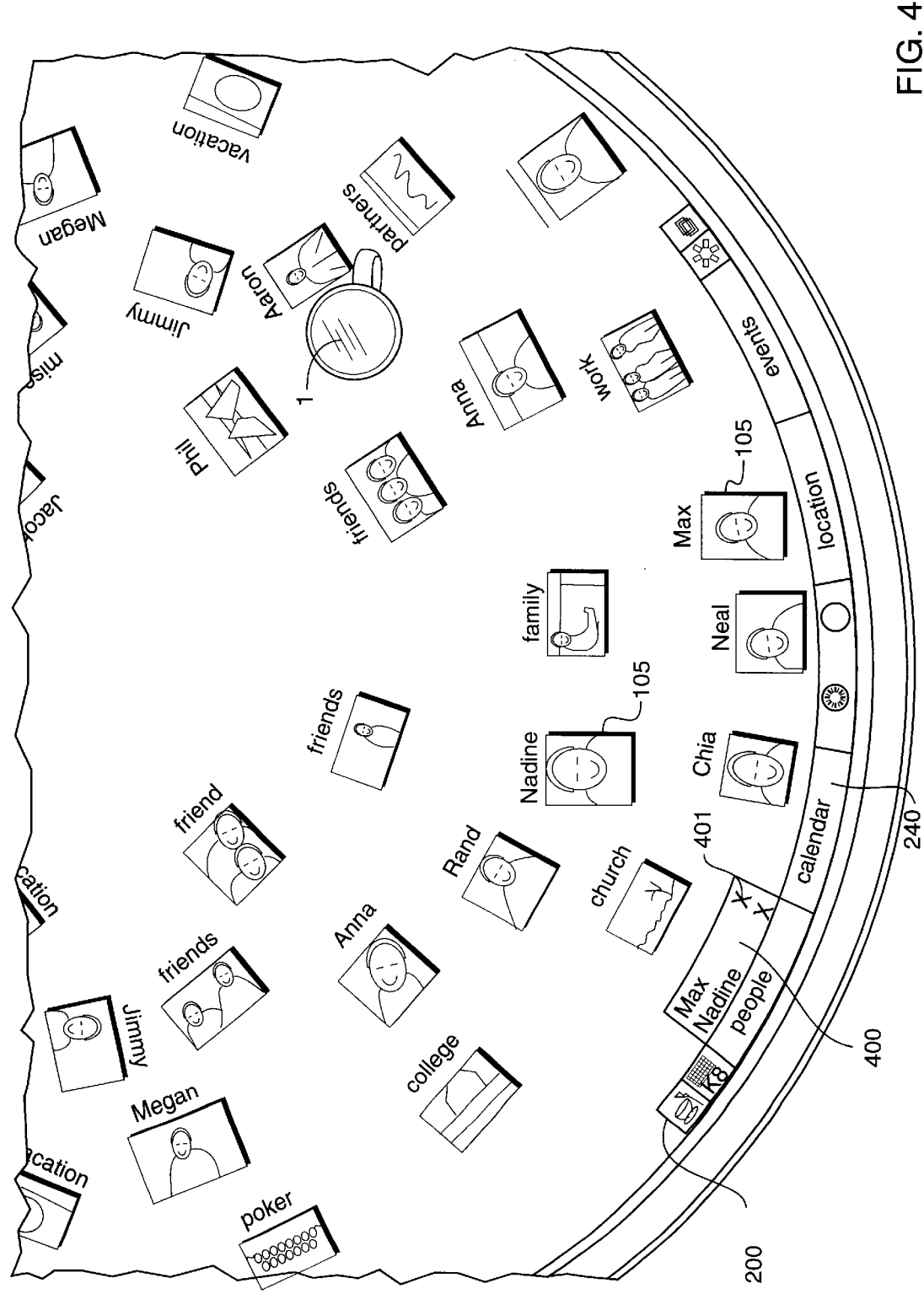
FIG. 4 is a diagram of pictures organized according to people.

The picture is shown with an orientation towards the control panel from where the selection took place, i.e. generally facing the user that selected the picture. Should another user subsequently want to view the same picture, selection will rearrange and reorientate the picture in the overall image accordingly. FIG. 4 shows two selected pictures 105, and a tab area 400 where the selections, e.g., "Nadine" and "Max," are marked with an "x" 401. Pointing at the "X" will deselect the picture.

FIG. 5 shows the content of the display when the calendar icon is selected. In the calendar view, miniatures 500 of the pictures are arranged in a temporal order 501 by year 502. Years are represented horizontally, while all pictures within a particular year are arranged vertically. The pictures of any previously selected people 400 are shown in color, and all other picture are shown in gray scale.

In one special calendar mode, not shown, the system composites all pictures that have the same date as the current day of the year. This mode can be used where members of a family or group at a meal time to share events that occurred that day.

Figure 7:
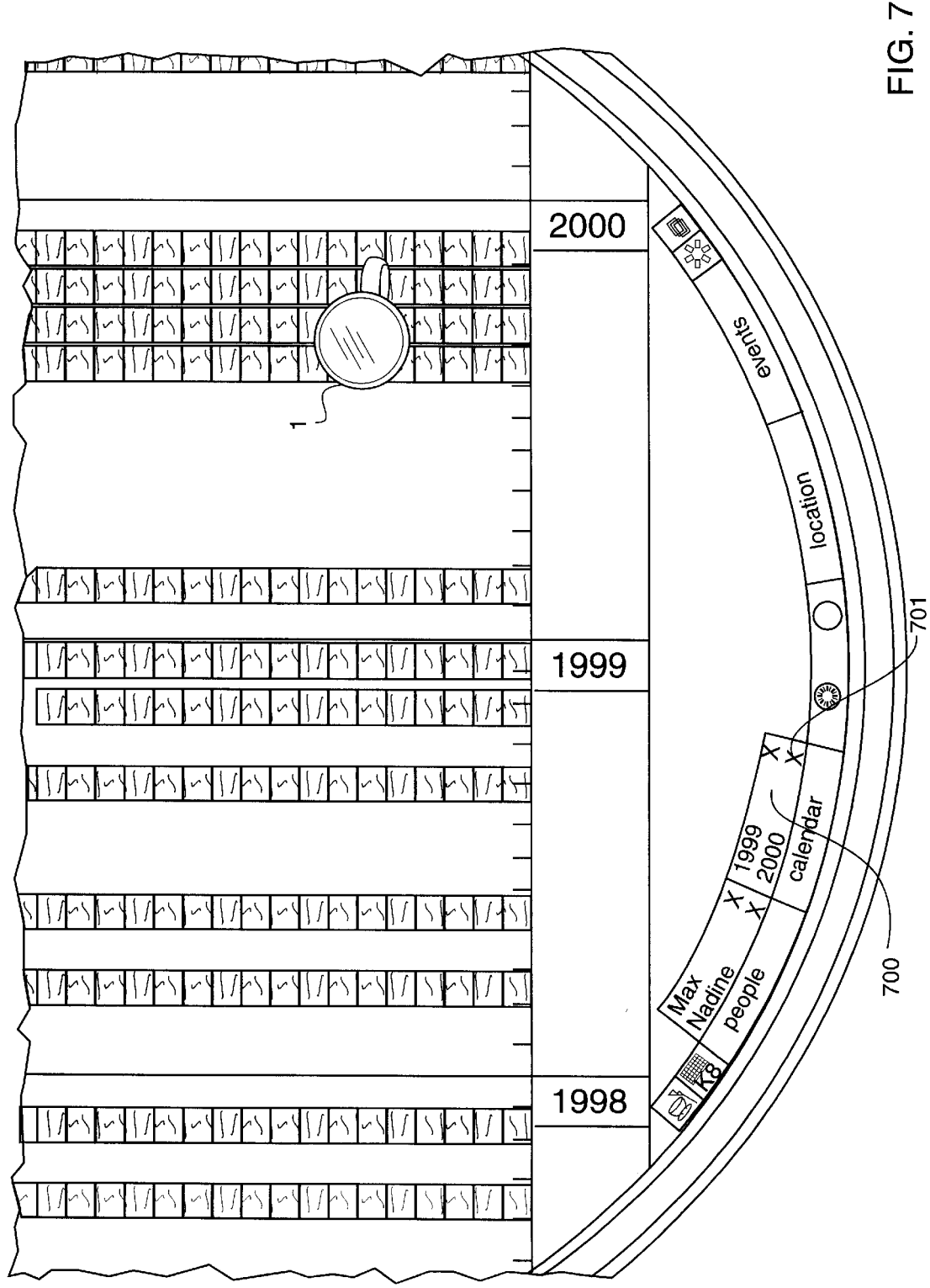
FIG. 7 is a diagram of the selected years.
Figure 8:
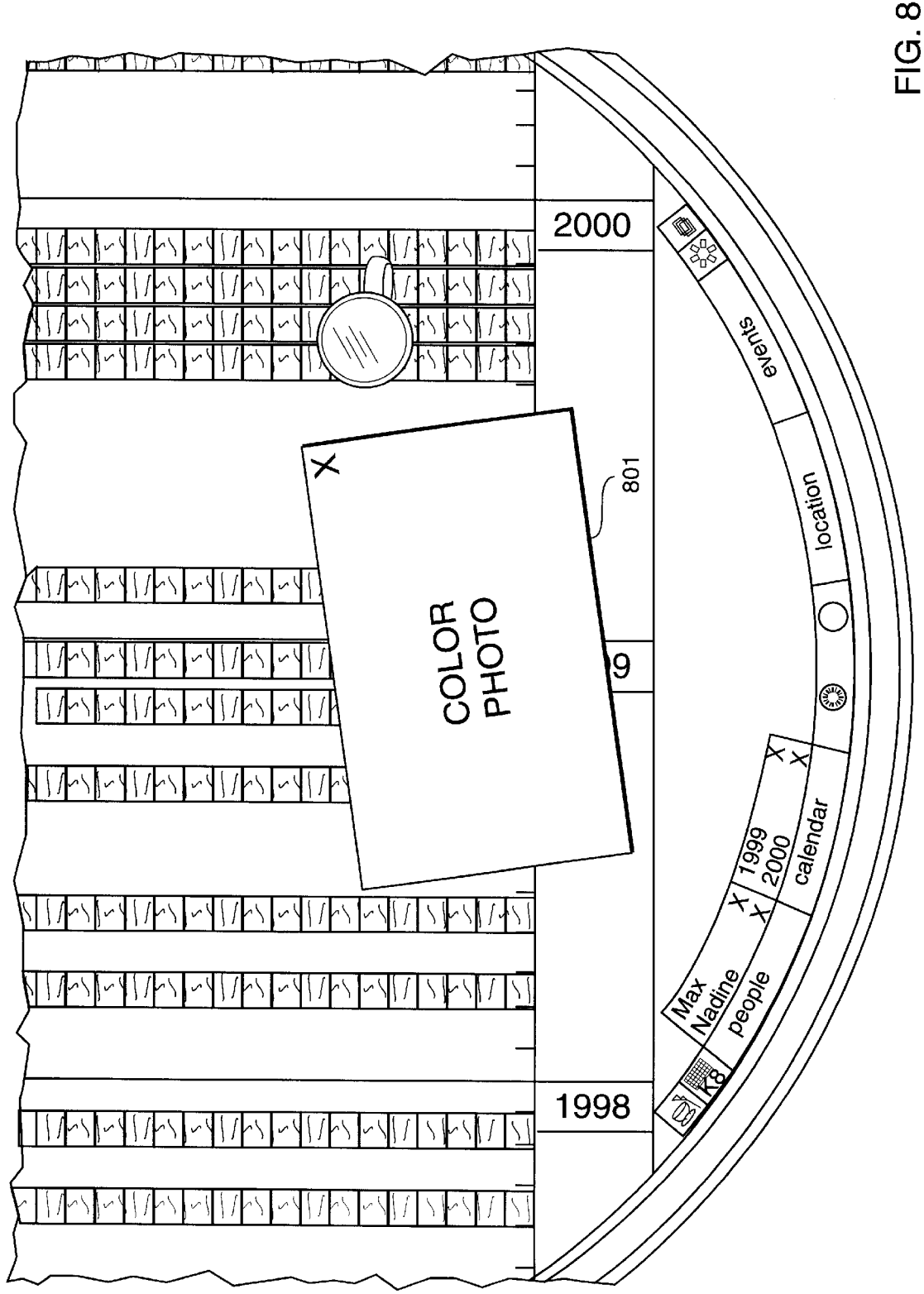
FIG. 8 is a pictorial of a selected picture.

FIG. 6 show the display when the inkpad icon 210 is activated. Now, the pointer (mouse or finger) can be used to select, e.g., if the current display mode is by calendar, then years 1999 and 2000 can be selected 600 with the pointing device as shown enlarged in FIG. 7. The inkpad can also be used to select in manner in accordance with other icons. Pointing at the "X" symbol will deselect the item. Now, pointing on a miniature picture will enlarge the picture 801 as shown in FIG. 8.

Figure 9:
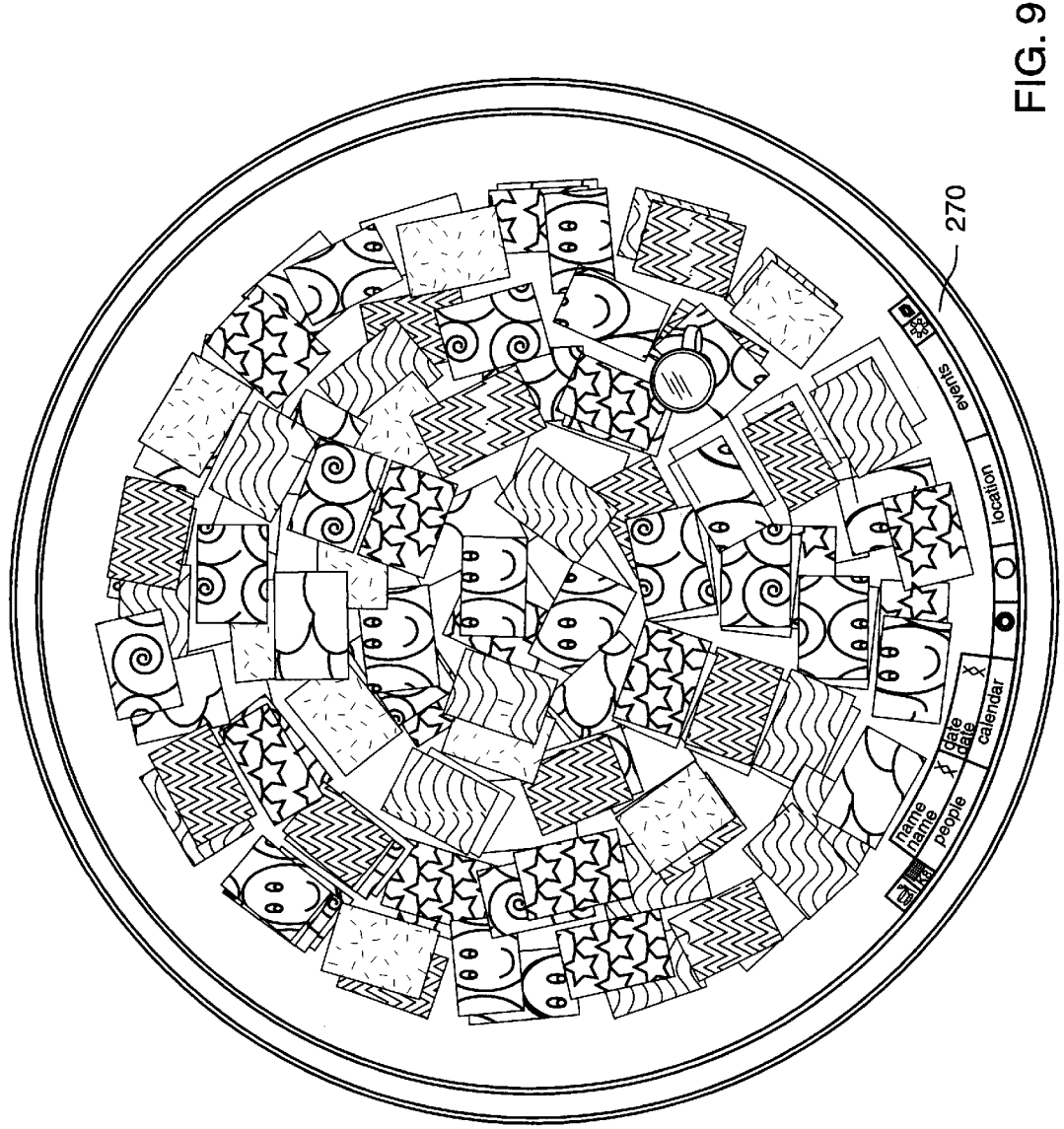
FIG. 9 is a diagram of multiple pictures.
Figure 10:
FIG. 10 is a diagram of a summary of pictures.

FIG. 9 is the view for the show icon to show all selected pictures, and FIG. 10 is the view for the summary icon 280. Note, how the pictures are spread out in a pile facing in all directions in both of these modes. This is quite unlike the rectangular single orientation of prior art "overview" slides. Here, all user around the presentation surface will have an equal number of pictures facing towards them. Some overlap is used, to give the presentation a more natural appearance.

Figure 11:
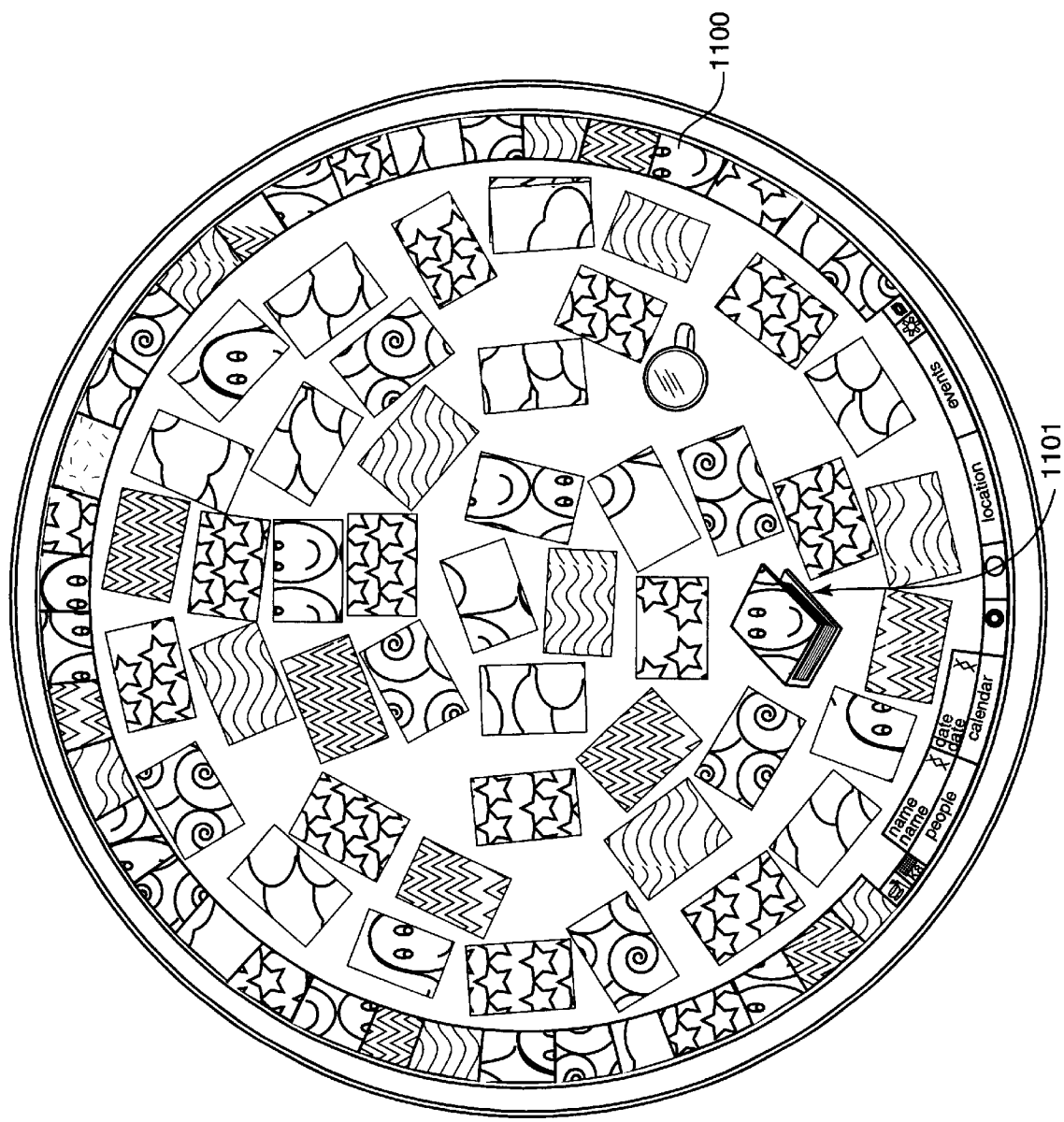
FIGS. 11 is a diagram of an album of pictures for relating an event.
Figure 12:
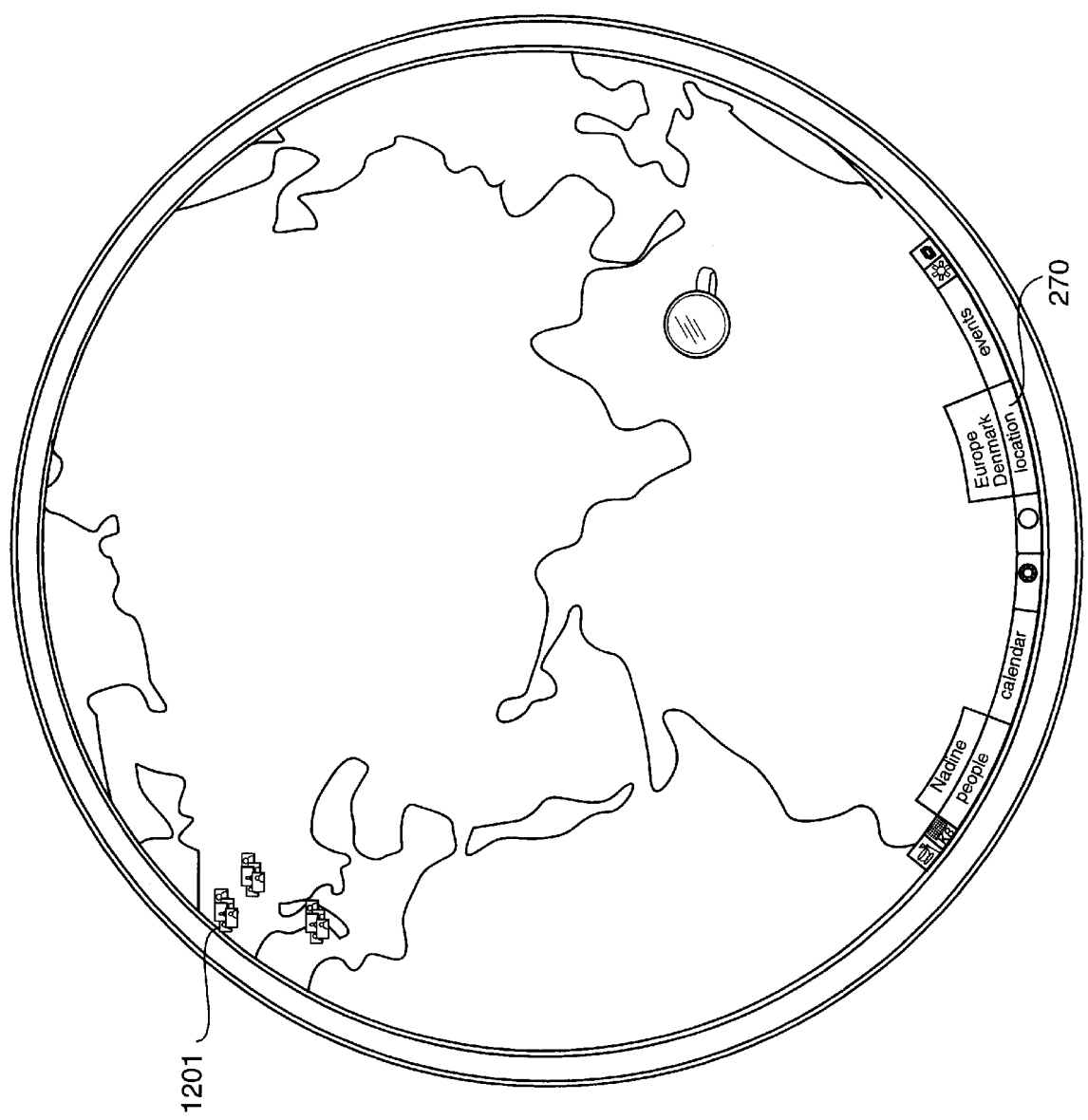
FIGS. 12, 13, 14, 15, 16 and 17 are diagrams of a location view of a picture presentation.
Figure 13:
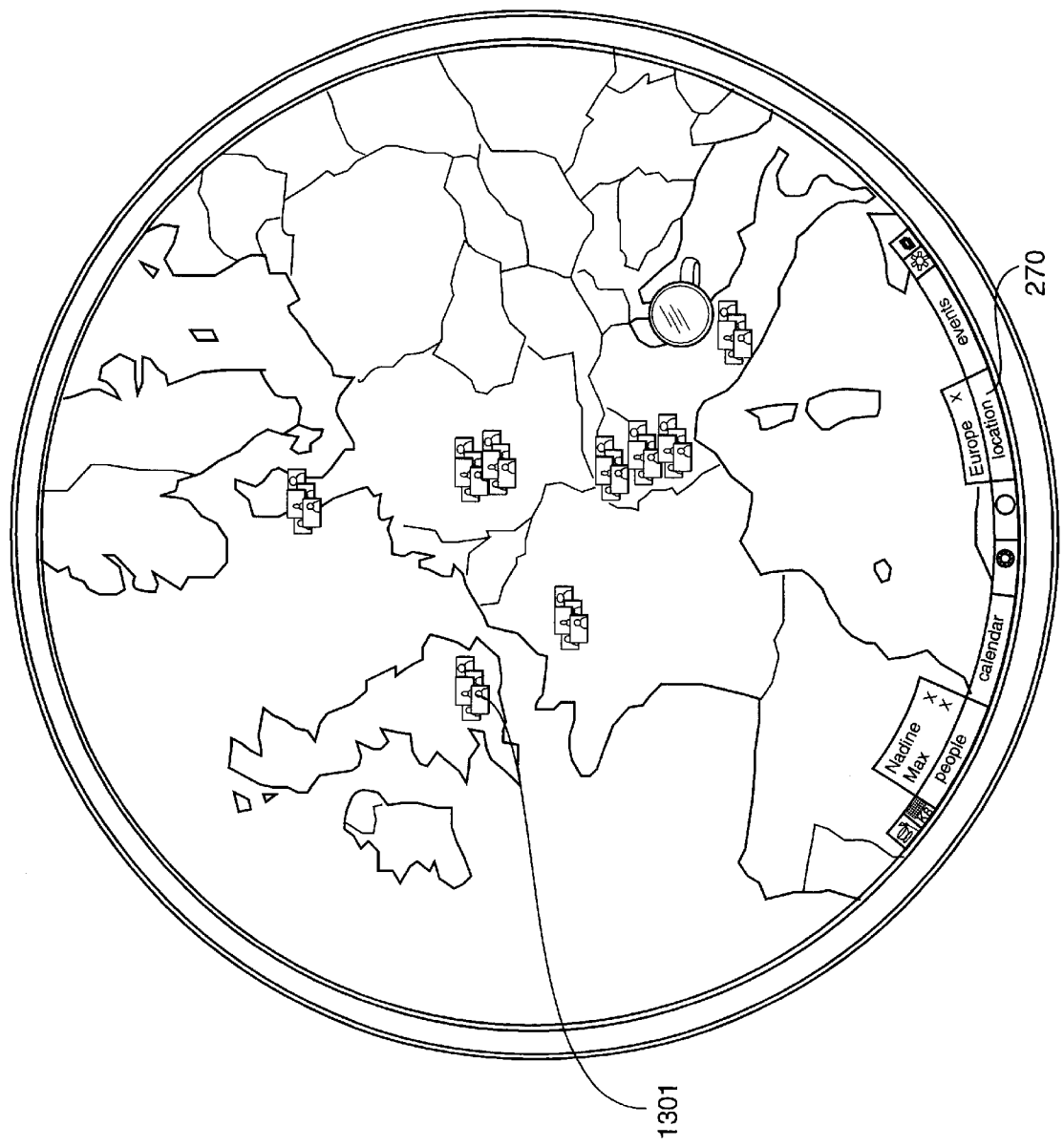
Figure 14:
Figure 15:
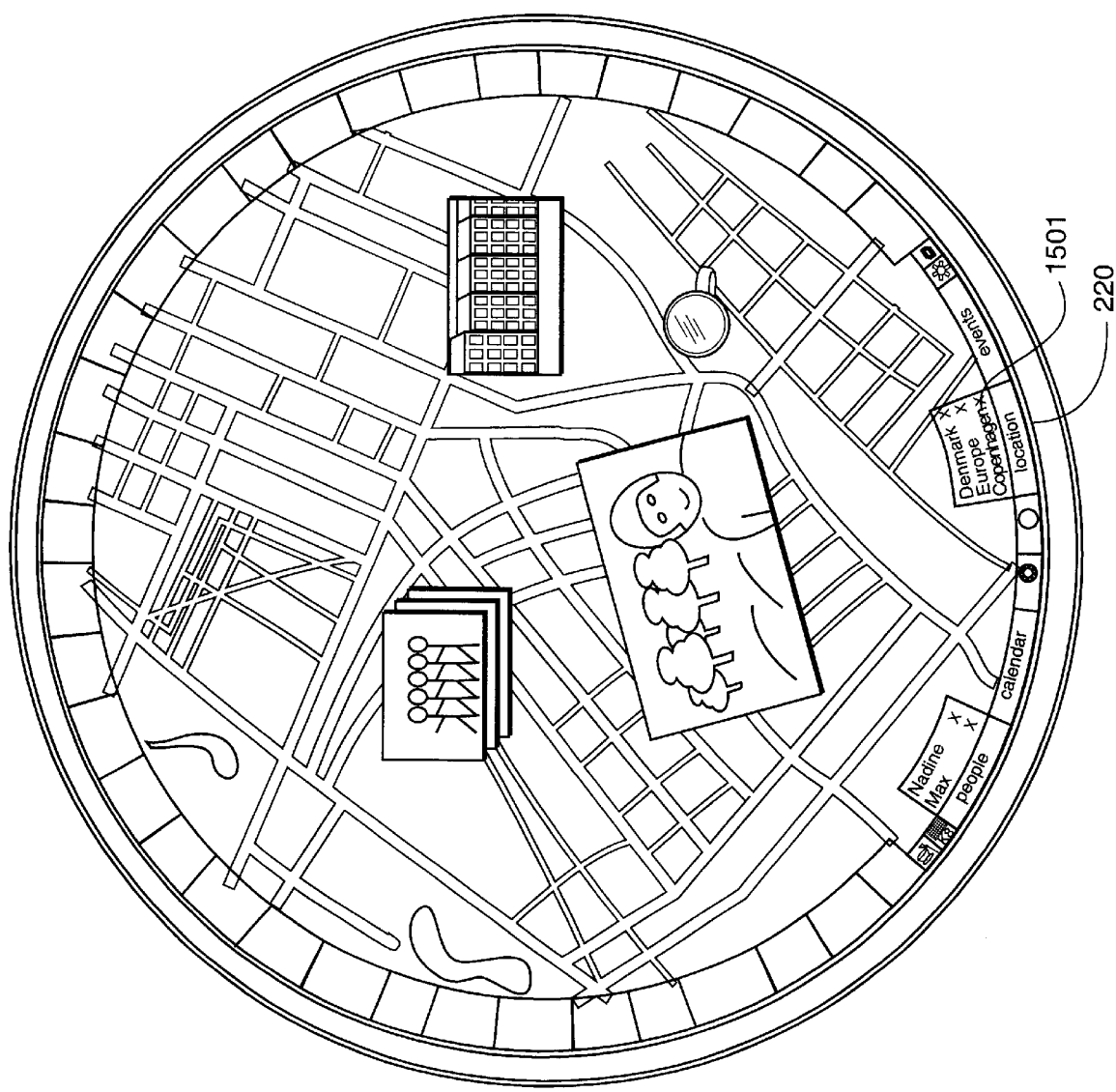

FIG. 11 shows all currently selected pictures around the periphery 1100. Thus, the "steering wheel" technique can be used by all users conveniently review all selected pictures. FIG. 11 also shows a picture 1101 in "photo album" format. The photo album 1101 represents a pre-authored "story" including a set of pictures and optional soundtrack that a user has assembled into some particular sequence to be played when the album 1101 is selected. Pictures in the album can be "dragged" to different orientations and areas on the display table. Selecting the album "tells" a story associated with the pictures in the album. The system 200 can also composite in other selected pictures 1102 according to preformulted rules. For example, selecting picture of a specific person at a specific location can cause the system to also composite pictures of other persons at the same location.

FIG. 12–15 show views when the location icon is selected, in an increasing order of detail, miniatures 1201, 1301, and 1401 of pictures at locations increase in size as the user "zooms" in on a particular location. Locations 1501 within the field of view are shown next to the location icon 270.

Figure 16:
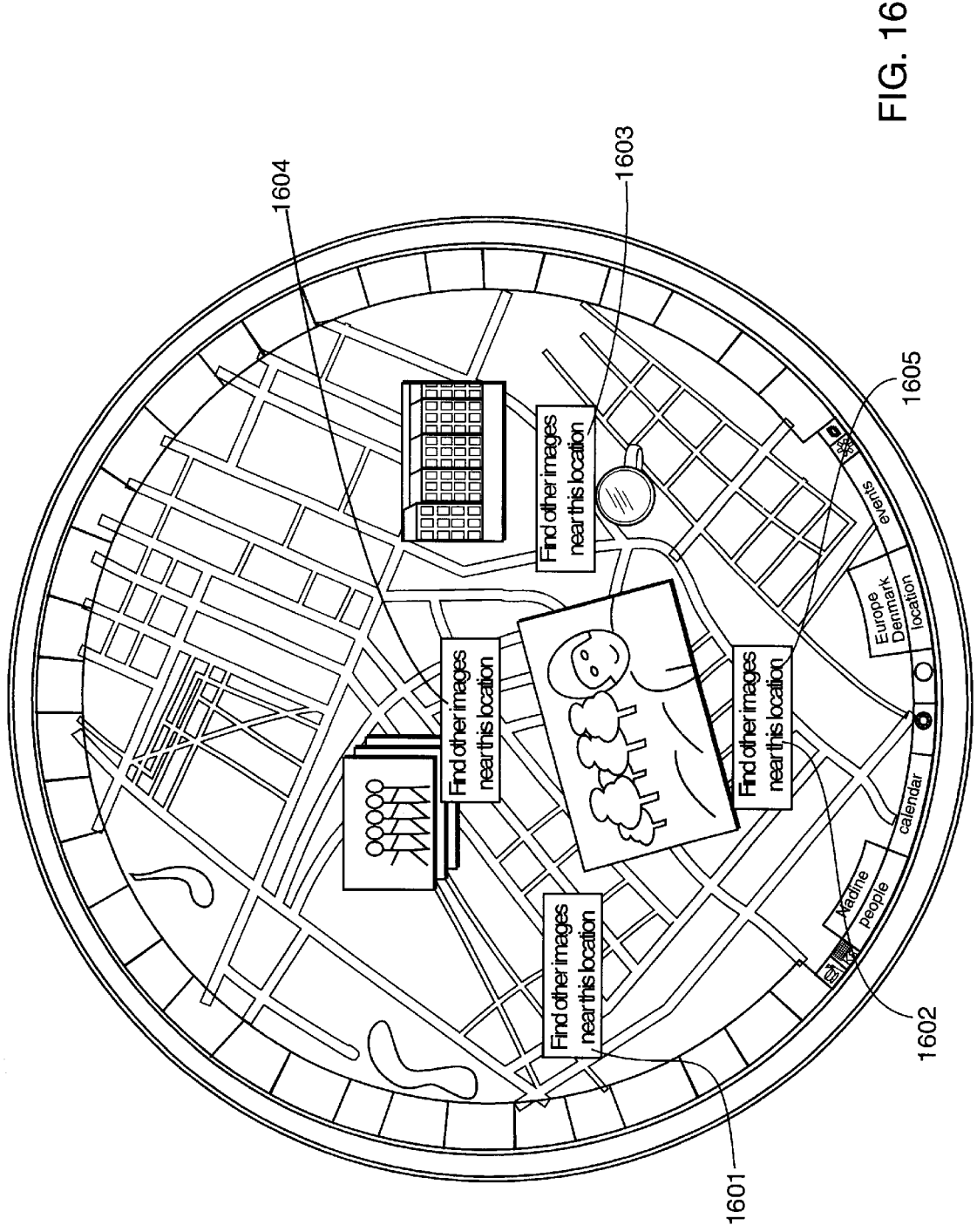

FIG. 16 shows association icons 1601–1604. Selecting one of these icons will bring up additional related pictures, as shown in FIG. 17.

Figure 19:
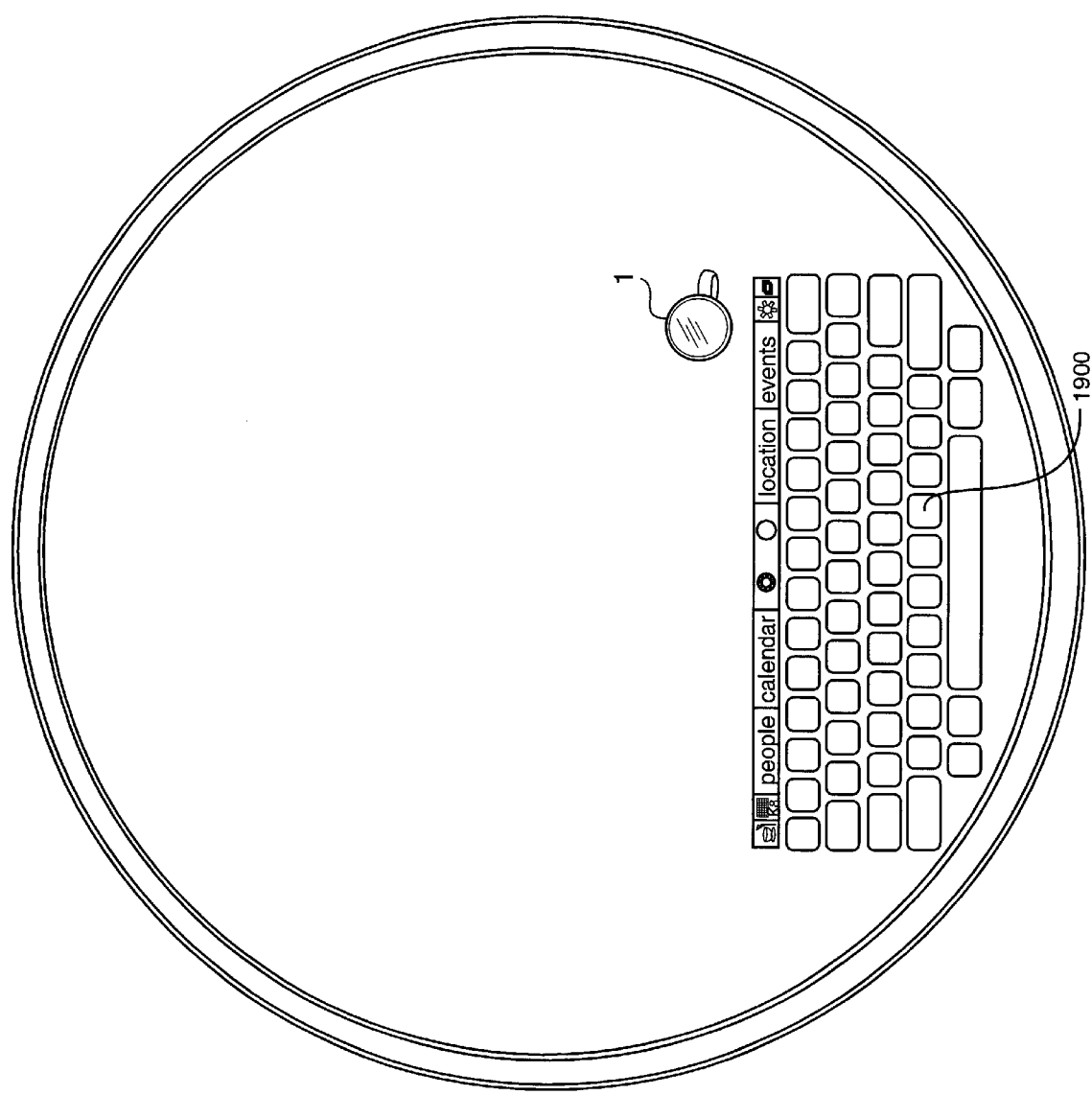
FIG. 19 is a keyboard used to interact with the presentation system according to the invention.

FIG. 18 shows the display when the new icon 260 is selected, and FIG. 19 a keyboard in response to selecting the keyboard icon 220.

FIG. 20 shows a system 2000 according to the invention. The system includes a processor 2010 coupled to a projector and an input device 2020, e.g., a touch sensitive surface or a mouse. Images are displayed on the top 130 of the table 125 under user control with the input device. The system also includes a relational database 2001 for storing the annotated pictures 105.

FIG. 21 is a flow diagram of a process executing in the processor 2001 while generating the sequence of images. Activating the icons 210, 220, 230, 240, 250, 260, 270, 280, 290, and 295 cause the images to be composited as described above. Activating the orientation area causes the image to be oriented in a specified manner, for example, if the area is a ring, the activation will rotate 205 the images 2130. The annotate function 2140 is used to add the name, date, location, and events 2111–2114 annotations to the pictures 105 stored in the picture database 2001. During operation of the system step 2110 processes the icons upon activation or selection, and step 2120 generates the composited images 2130.

It is to be understood that various other adaptations and modifications may be made within the spirit and scope of the invention. Therefore, it is the object of the appended claims to cover all such variations and modifications as come within the true spirit and scope of the invention.

We claim:

1. A system for interacting with a presentation by multiple users, the system comprising:
    a circular display surface having a horizontal orientation, the circular display surface positioned between the multiple users;
    a processor configured to composite a circular image, the circular image including a circular picture display area, an orientation area in the form of an annular rim at the periphery of the circular image, and a plurality of control panels, there being one separate control panel for each of the plurality of users;
    a database, coupled to the processor, to store a plurality of annotated pictures, the annotated pictures for compositing into the circular picture display area of the circular image;
    a display device, coupled to the processor, to display the circular image on the circular display surface; and
    an input device, coupled to the processor, to interact with the plurality of control panels, the orientation area, and the plurality of annotated pictures to enable the plurality of users to concurrently control the compositing of the circular image.

2. The system of claim 1 wherein each control area is in the form of an arc adjacent to the corresponding user and the periphery of the circular image.

3. The system of claim 1 wherein each control panel includes a people, a calendar, a location, and an events icons.

4. The system of claim 3 wherein each control panel further includes an inkpad, a keyboard, a work space, a new, a show, and a summary icons.

5. The system of claim 1 wherein the circular display surface is touch sensitive.

6. The system of claim 3 wherein each icon is displayed in black on a white background when inactive, and in full color when activated.

7. The system of claim 3 wherein each picture is annotated according to name, date, location and events, and wherein the people icon selects pictures by name, the calendar icon selects pictures by date, the location icon selects pictures by location, and the events icon selects pictures by events.

8. The system of claim 7 wherein composited pictures in the circular image are shown in gray scale, and selected pictures are shown in full color.

9. The system of claim 7 wherein a particular pictures is composited with an orientation toward a particular control panel used to select the particular picture.

10. The system of claim 4 wherein the inkpad icon is used to select a particular picture composited in the image.

11. The system of claim 1 wherein a particular picture represents a set of related pictures, and selecting the particular picture composites the set of related pictures in the sequence of images in a predetermined order.

12. The system of claim 7 wherein a map is composited into the image when selection according to location.

13. The system of claim 4 wherein the keyboard icon is used to composite a keyboard into the circular image.

14. The system of claim 1 wherein the display device is an overhead projector.

15. A method for interacting with a presentation by multiple users, the method comprising:

storing a plurality of pictures in a database;

annotating each picture according to name, date, location, and event;

compositing a circular image including a circular picture display area, an orientation area in the form of an annular ring, and a plurality of control panels, there being one control panel for each of the plurality of users;

selecting a subset of the plurality of pictures by interacting with the plurality of control panels;

compositing the subset of pictures into the circular image; and displaying the circular image on a circular horizontal display surface according to an orientation determined by an interaction with the orientation area.

16. The method of claim 15 further comprising:

tracking the plurality of users; and moving the respective control panels according to the tracked users.

17. The method of claim 15 further comprising:

rotating the entire circular image.

* * * * *